Aug. 12, 1924.
P. SHISHKOFF
MEANS FOR MAINTAINING VACUA OR PARTIAL VACUA
Filed Dec. 10, 1921   2 Sheets-Sheet 1
1,505,080
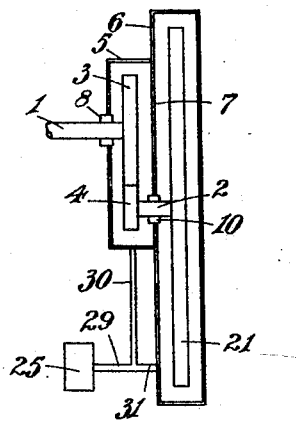
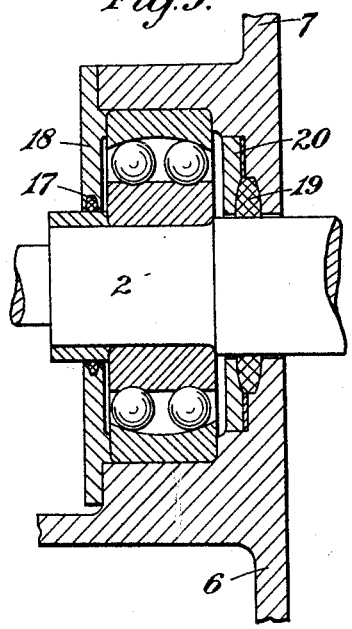
Inventor.
Paul Shishkoff
by Seward Davis
his Attorney

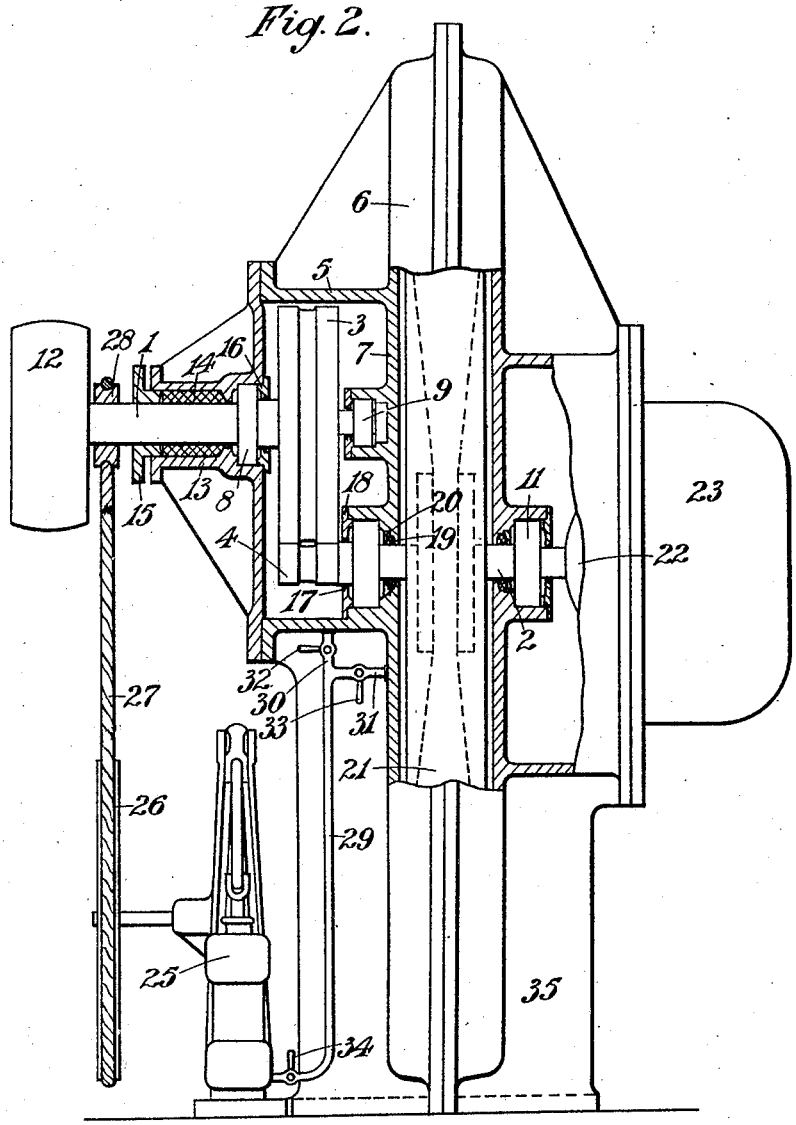

Patented Aug. 12, 1924.

1,505,080

UNITED STATES PATENT OFFICE.

PAUL SHISHKOFF, OF RICHMOND, ENGLAND, ASSIGNOR TO MARGARET ELLEN DEBORAH SMITH, OF LONDON, ENGLAND.

MEANS FOR MAINTAINING VACUA OR PARTIAL VACUA.

Application filed December 10, 1921. Serial No. 521,431.

*To all whom it may concern:*

Be it known that I, PAUL SHISHKOFF, of 50 The Vineyard, town of Richmond, in the county of Surrey, England, a Russian citizen, have invented an Improved Means for Maintaining Vacua or Partial Vacua, of which the following is a specification.

The object of this invention is to overcome the disadvantage to the employment of vacuum casings surrounding high speed rotating elements which arises out of the fact that the air-tight packings at the points where the shaft directly coupled to the high speed element enters or leaves the vacuum casing are necessarily of such a nature that they introduce a very large amount of extra frictional resistance and thereby counteract to a considerable extent the saving of power due to the elimination of wind resistance. This difficulty is overcome according to the present invention by the provision of speed reduction gearing between the high speed rotating element and the shaft coupled to it which penetrates the vacuum casing so that the substantial airtight packing is about a low speed rotating shaft thereby considerably reducing the loss of power due to frictional resistance.

In the preferred arrangement the drop of pressure from atmosphere to the high degree of vacuum about the high speed rotating element is carried out in two stages, that is to say an inner vacuum chamber is provided for the high speed element and the shaft directly coupled to this element passes through the wall of the vacuum chamber to an adjacent chamber wherein the pressure is slightly higher. A light packing only is necessary therefore about this high speed shaft. The reduction gearing is located in the adjacent chamber and the low speed shaft passing out therefrom is surrounded with a comparatively heavy packing since it has to provide for the major portion of the difference in pressure between atmosphere and the inner vacuum chamber.

The preferred manner in which this invention is carried into practice will now be described with reference to the accompanying drawings, in which:—

Figure 1 is a diagrammatic elevation of the device.

Figure 2 illustrates the device in sectional elevation with certain parts broken away, and Figure 3 is an enlarged detail of one bearing and shaft packings.

In the drawings, 1 designates a driving shaft, 2 a driven shaft, 3 and 4 gears for transmitting motion from one shaft to the other, 5 an airtight gear casing, 6 an airtight machine casing and 7 a wall separating the casings. The shafts are housed in bearings 8, 9, 10 and 11 in the walls of the casings. Shaft 1 is driven by a belt running over pulley 12 or by an internal combustion engine and the end shield of the gear casing 5 is provided with a stuffing box 13, gland 14 and packing 15 on the outside. Within the gear casing a packing ring 16 carrying a thin flexible packing washer is secured. Shaft 2 is packed by a washer 17 held by a ring 18 on one side of the ball bearing and by a similar washer 19 held by a ring 20 on the other side of the bearing.

Upon the shaft 2 is mounted a flywheel 21 and also, outside the bearing 11, the armature of an electric generator 22 for example enclosed within an airtight casing 23 secured to the annular flange 24 on the flywheel casing. The air pump 25 is driven for example from shaft 1 through pulley 26, belt 27 and pulley 28. This pump may be separately driven electrically or otherwise. The intake of the pump is connected to a suction pipe 29 which bifurcates forming branches 30 and 31 fitted with stop cocks 32 and 33. A main stop cock is provided at 34 when necessary. The arrangement above described is mounted on a pedestal 35. The suction pipes 30 and 31 communicate with the interiors of the gear and machine casings respectively.

Referring to Figure 1, the shaft 1 runs at low speed and the packing outside bearing 8 is relatively heavy and tight. The packings on both sides of bearing 10 are however relatively light and consist of thin flexible washers as above described. The friction resistance of the washers is very small compared with that of the packings on shaft 1 otherwise the frictional loss owing to the high speed of shaft 2 would be unduly large. As hereinafter pointed out, the difference between the atmospheric pressure and that inside the gear casing 5 is very large and the packing between must be appropriate. On the other hand the difference between the pressures on opposite sides of wall 7 is very small and consequently the packings between may be very light.

The operation of the device is as follows. When the set is started up the cocks 32, 33 and 34 are all opened so that the air is quickly exhausted from the two casings. Assuming the vacuum gauge fitted in pipe 29, but not shown, indicates 25 inches of vacuum the cock 32 is now closed whereupon the gauge immediately rises to 30 for example. This is due to the fact that leakage through the packings surrounding shaft 2 is very small. If cock 32 is again opened the gauge falls back to 25 inches and the vacuum in casing 6 falls immediately to that value owing to the increased leakage of air through pipes 30 and 31. The difference in pressure between atmosphere and the interior of casing 5 is therefore—in the specific case referred to—about 25 inches of mercury whereas the difference between the pressure on opposite sides of wall 7 is only about 5 inches of mercury when cock 32 is closed.

It will be noted that according to this invention the packing between the casing to be evacuated and atmosphere is divided into two or more stages and that the higher the normal speed of any shaft the lower is the difference between the pressures on opposite sides of the packing for that shaft and vice versa. In other words where the difference in pressures on two sides of a packing and consequently the frictional resistance thereof, is great, the speed of that shaft is low and vice versa.

Although in the case referred to above the packing is divided into two steps, it is desirable in some cases to introduce three or more steps or shaft packings between the lowest speed shaft and the highest speed shaft.

The invention hereinbefore described may be employed in various ways. Referring to Figure 1 for instance such an arrangement can be applied with distinct advantage in the case of a high speed turbine where the flywheel 21 is to be considered as the rotor of the turbine and the gear wheels 3 and 4 are used to reduce the speed of the driven shaft 1 to an appropriate value. The arrangement shown in Figure 2 is intended to be applied to the case where a prime mover stores energy in a flywheel running at a very high speed and is then disconnected whereupon the flywheel acts as motor to drive an electric generator. The means for disconnecting the prime mover from the flywheel have not been shown, as they form no part of the present invention; but so that the operation will be understood it should be noted that a clutch operated electrically or otherwise is arranged within casing 5 so as to disconnect the driven shaft 2 from the gears 3 and 4 so that the latter do not rotate during the time the prime mover is cut out and the flywheel is acting as motor.

Generally it is only necessary for the pump 25 to be in operation during the time the prime mover is driving shaft 1 to store energy in the flywheel because when the casings are evacuated the cocks in the suction pipes are then closed and the vacuum will hold up for a prolonged period generally until the prime mover is automatically started again. In some cases however the pump 25 is separately driven as by an electric motor and controlled by a vacuum gauge which automatically starts the pump when the vacuum falls to a predetermined value.

I claim.

1. In a power transmission system the combination of a high speed rotating element, a low speed rotating element, gearing connecting said elements, an air-tight casing enclosing said elements and gearing, means for coupling said low speed element to mechanism external to said casing, and means for extracting air from said casing.

2. In a power transmission system the combination of a fly-wheel, gearing comprising a low speed element and a high speed element, a shaft coupling said high speed element and said flywheel, an air-tight casing enclosing said flywheel and gearing, a shaft coupled to said low speed element and passing through a wall of said air-tight casing, and means for extracting air from said casing.

3. In a power transmission system the combination of an air-tight casing, a partition forming two substantially air-tight compartments in said casing, a fly-wheel in one of said compartments, gearing in the other of said compartments comprising a low speed element and a high speed element, a shaft coupling said high speed element and said flywheel passing through said partition, a shaft coupled to said low speed element and passing through a wall of said air tight casing, and means for extracting air from said compartments.

4. In a power transmission system the combination of a fly-wheel, a translating device coupled to said flywheel, gearing comprising a low speed element and a high speed element, a shaft coupling said high speed element and said flywheel, an air-tight casing enclosing said flywheel translating device and gearing, a shaft coupled to said low speed element and passing through a wall of said air-tight casing, and means for extracting air from said casing.

5. In a power transmission system the combination of an air-tight casing, partitions forming three substantially air-tight compartments in said casing, a fly-wheel in one of said compartments, gearing in another of said compartments, a translating device in the other of said compartments, a shaft coupling said flywheel and the high speed element of said gearing, an air-tight packing about said shaft where it passes through the partition between said flywheel and gearing a shaft coupling said flywheel and said translating device, an air-tight packing about said shaft where it passes through the partition between said flywheel and translating device, a shaft coupled to the low speed element of said gearing and passing through a wall of the said air-tight casing, air-tight packing about said shaft, means for coupling said shaft to power transmission mechanism external to said casing, and means for extracting air from said compartments.

PAUL SHISHKOFF.